Patented Nov. 3, 1936

2,059,394

UNITED STATES PATENT OFFICE 2,059,394

PLASTIC COMPOSITION

Alan F. Randolph, Montclair, N. J., assignor, by mesne assignments, to E. I. Dupont De Nemours & Company, Wilmington, Del., a corporation of Delaware No Drawing. Application April 26, 1934, Serial No. 722,487

8 Claims. (Cl. 106—40)

This invention relates to plastic compositions and, more particularly, to plastic molding powders adapted for use in molding objects of variegated color, and to the preparation of such molding powders.

There is a considerable commercial demand for molded articles of variegated, mottled, or marbled appearance. Heretofore, such effects have been obtained either by producing the desired mottle in a sheet material and using the latter to make up blanks for the desired molded article, or by making up separate granular molding compositions of different colors and mingling two or more of these in the charge of material put into the molding die. As far as using mottled sheet material is concerned, the obvious drawback is that it does not effect the economies inherent in the use of molding powders, nor can certain results be obtained in this manner. The use of separate granular molding compositions of different colors has not been satisfactory because the articles molded therefrom do not develop fine gradations of color, the granules of different color blending very little. The effect obtained in this manner has not been considered satisfactory by the trade for all purposes.

An object of the present invention is to provide a plastic molding powder which is adapted for molding articles having very fine and delicate gradations of color. A further object is to provide a simple and economical process for preparing such molding powders. A still further object is to provide plastic compositions adapted to be worked up by various means in the plastics art to give finished products having variegated color effects. Other objects of the invention will be apparent from the description given hereinafter.

The above objects are accomplished according to the present invention by adding to a plastic while it is being kneaded to form a compacted, coherent mass a coloring matter, continuing said kneading, and terminating the kneading before the coloring matter is uniformly distributed throughout the mass, said compacted mass being then broken down into granular form.

In the preparation of molding compounds it is becoming customary to knead the plastic in a masticator mixer, or similar apparatus that will give a thorough and strenuous kneading and homogenizing action, to compact the same and thus produce a comparatively dense mass which is subsequently broken down into granular form for use directly in molds or for use in a pelleting machine where the material is pelleted to put it in convenient form for use in molds.

This kneading operation is particularly applicable to plastics such as the organic cellulose esters, cellulose ethers, various urea-formaldehyde resins, various resins obtained by the polymerization of the esters of the alkacrylates, such as methyl methacrylate, and polyvinyl resins, in the preparation of molding powders. Preferably this kneading treatment is carried out in a masticator mixer, such as a Banbury mixer, which is loaded with the plastic, plus other ingredients desired to be included, to such a point that the pressure ram of the mixer exercises a positive pressure upon the contents during the kneading to force the material into the narrow clearances between the blades and adjacent wall of the mixer whereby the material is given a thorough and strenuous kneading. Other mixing apparatus which will give a thorough kneading action, such as a screw stuffer, may be used but the masticator mixer has proved the most satisfactory type. As disclosed in the above identified applications, the plastic mixture may be kneaded to to a point where it is formed into a homogeneous, cellulous, friable mass somewhat spongy in appearance, or may be kneaded further into a continuous, rather tough, horny mass, in either case a compacted, coherent mass being obtained. The plastic mass resulting from either the short or longer operation is homogeneous throughout, that is, any plasticizer, coloring matter, or additional ingredient, will be found uniformly dispersed throughout the mass. Accordingly, coloring matter employed with the plastic will give a uniformly colored mass which, when broken into granular form and used in molding articles, will of course give only uniformly colored articles.

It has now been found that this general method of preparing molding powders can be satisfactorily and economically adapted for the preparation of molding powders for use in molding articles having a variegated, mottled, or marbled appearance with the most delicate and fine gradations of color, by adding coloring matter to the plastic during the kneading step and terminating the kneading before the coloring matter has been uniformly distributed throughout the compacted mass.

The present invention may be carried out by kneading a plastic mixture of one color and then, relatively late in the kneading cycle, adding a contrasting coloring matter and continuing the kneading until the mass has reached the desired physical form, the addition of the contrasting coloring matter being delayed enough so that it will not have been uniformly dispersed throughout the mass when the kneading has proceeded long enough to give the mass the desired physical properties. Upon breaking down the compacted mass into granular form there results a compacted, high bulk density plastic in granular form, the individual granules ranging in color from one distinct hue through a countless number of blends to another distinct hue. Upon molding this powder, either with or without pelleting, an article of variegated appearance will be obtained with fine gradations of color, such as never have been obtained heretofore through the use of molding powders. Obviously two or more contrasting colors could be added instead of one and these colors may be added at different stages of the kneading cycle so that one will be distributed to a greater degree than another added at a later stage of the kneading cycle.

Instead of adding coloring matter alone during some stage of the kneading cycle, a batch of the same plastic or compatible plastic, having coloring matter uniformly incorporated therein, may be added, the kneading being terminated before the two batches are completely blended together. In this modification of the invention the bulk of the second batch added is usually so great that a portion of the first batch must be removed from the mixer in order that the pressure ram may be placed in operating position after addition of the second batch, where a masticator mixer is employed. A plastic mass of variegated appearance will be obtained and is similar to the mass obtained where the coloring matter alone is added.

The following examples are given to illustrate the invention, parts being given by weight:—

*Example 1.*—This is an example of the invention as applied to the manufacture of molding compounds where the kneading is stopped when a cellulose, friable, compacted and coherent mass is obtained.

A mixture of 78 parts cellulose acetate, 22 parts dimethoxyethyl phthalate and 0.0001 part Luxol Fast Yellow G was kneaded in a Banbury mixer. It was previously determined that, under the conditions of temperature and loading involved, the mass would reach the desired cellulous, friable state in 3 minutes. The kneading of this initial mixture was discontinued after two minutes and thirty seconds, the mixer stopped and the loading port opened. Upon the top of the charge in the mixture was then introduced 0.003 part of titanium dioxide. The mixer was then closed again and the kneading under positive pressure continued for thirty seconds longer to complete the three minute cycle required to bring the material to the predetermined desired condition.

The discharged product was ground to granular form such as required in commercial molding. This granular product was made up of some particles containing none of the titanium dioxide, of some containing a relatively high concentration of titanium dioxide, and of particles of various intermediate contents of this pigment. When molded the powder gave an article of mottled, veined or marbled effect having a body color of yellow transparent with a veining of white, which veining ranged from opaque to translucent.

*Example 2.*—This likewise illustrates the invention was applied to the manufacture of molding powder where the kneading is terminated when the plastic has reached a cellulous, friable state. A mixture of 78 parts cellulose acetate, 22 parts dimethoxyethyl phthalate, and 0.001 part Luxol Fast Yellow G was kneaded in a masticator mixer under conditions such that the desired end point would be reached in three minutes. The kneading was discontinued after two minutes and 15 seconds and one-eighth of the batch was removed from the mixer and in its place was loaded an equal weight of material of the same composition except that it contained, instead of the Luxol Fast Yellow G, 0.025 part of titanium dioxide per 100 parts of material, the added material having been previously kneaded similarly to the main charge. The combined charge was now kneaded until the desired end point was reached. This required slightly more than 45 seconds, inasmuch as the batch was slightly cooled during the interruption of the kneading.

The discharged product, treated similarly to that of Example 1, yielded a molded article resembling that of Example 1 but exhibiting less marked contrast in this mottle.

*Example 3.*—A colored molding composition comprising 60 parts reactive urea-formaldehyde and 40 parts of purified wood pulp (so-called "alpha flock") in the form of a finely divided uniform powder such as is obtained by prolonged grinding in a ball mill was loaded into a masticator mixer in the usual quantity so that during the operation of the mixer the mass would be subjected to the pressure of the ram. It had previously been determined that, under the conditions of operation, the contents of the mixer would be compacted to the desired degree in one minute. The mixer was run for 45 seconds and then stopped. The loading port was opened and there was introduced upon the top of the charge one part of a finely ground mixture of urea-formaldehyde resin, purified wood pulp and hydrated chromium oxide in the proportion of 6—4—1, respectively, by weight. The mixer was then closed and the kneading continued for 15 seconds longer to complete the required one minute cycle.

The desired product was ground to a granular form as required in commercial molding. The granular product was made up of some particles containing none of the ground pigment, some particles containing a relatively high concentration of it and the remaining particles of various intermediate contents. When molded the granular product yielded an article of mottled or veined effect having a body color which was a translucent cream or ivory with mottling of green in various gradations of intensity.

It will be understood that the above examples are merely illustrative and the present invention broadly comprises, in the process of preparing molding powders and the like where the plastic is kneaded to give a compacted, coherent mass, the steps of stopping the kneading, adding coloring matter to the plastic in the mixer, continuing the kneading and terminating the kneading before the coloring matter has been uniformly distributed throughout the compacted mass. It will be appreciated by even those not familiar with this art that the addition of coloring matter will always be delayed to a relatively late stage in the kneading cycle so that the kneading may be continued to bring the plastic to the desired end point before complete distribution of the added coloring matter occurs.

The plastic material may initially contain no coloring matter or it may contain pigments, opaque or transparent, or dyestuffs, and likewise the subsequently added coloring matter or coloring matters, whether added alone or in a second batch of plastic, may be pigments, opaque or transparent, or dyestuffs. The coloring matter in the batch initially and the subsequently added coloring matter may be identical or different; the added coloring matter may be introduced at different stages of the kneading cycle. By these variations in procedure an endless number of variations may be effected in the appearance of the final molded product.

The coloring matter may be added either in dry form or in solution form. In some instances it may be found desirable to prepare the coloring material before its introduction, by stirring it or grinding it with a small quantity of the molding compound or some other compatible molding compound, and to use the resulting mixture instead of the coloring material by itself to produce the mottle in the mixer. For example, a ball milling of pigment with cellulose acetate before it is added to a cellulose acetate mixture will have the effect of insuring against the presence of undispersed pigment particles in the final product and will also reduce the maximum intensity of color produced by the pigment added. This reduction will depend upon the degree of dilution of the pigment by the cellulose acetate with which it is ground and also upon the point in the kneading cycle at which the additional molding composition is added.

The present invention has been described particularly with reference to the production of molding powders but the mottled product obtained from the kneading operation may be utilized in other ways. Thus, for example, in the case of materials which are capable of being cake pressed and sheeted, such as plasticized cellulose acetate, the variegated mass may, after or without intermediate grinding, be pressed into a block and this block may then be cut into sheets having a variegated or mottled appearance.

The present invention provides a simple method of producing a variegated composition which, upon being molded or otherwise worked up, will yield articles of mottled, veined, or marbled appearance. It makes possible the duplication of effects heretofore gotten only through the medium of first forming the material into slabs or sheets, in which the mottled effects were gotten, for example, by the combining of different colored masses upon mixing rolls.

It has been difficult and indeed impossible, except to a more or less limited degree, to develop fine gradations of color in the finished molded article when preparing molded articles from mixtures of two or more solid colored molding compounds. Where the mottle is obtained in that manner, by merely mixing granules of one color with granules of another color there takes place comparatively little blending of the two, which alone can result in fine gradations of mottle in the finished article. By the present process, however, there is automatically produced in a granular molding powder a mixture of individual granules ranging through an infinite number of gradations of colors between the limits of the uniform body color of the initial material on the one hand and that of the subsequently added coloring matter or coloring matters on the other hand, for some granules will contain the initial color only, some will contain the added coloring matter only or extremely high concentrations of the added coloring matter, but all of the other granules which go to make up the composition will contain various proportions between these two limits. The result is that the mottle in the molded article made therefrom will be characterized by fine gradations and veinings of color such as heretofore have been obtainable only by the application of a special technique to plastics in doughy condition, that is, on the mixing rolls regularly used in the pyroxylin plastics industry.

The present invention provides a method of delivering to the molding shop a granular powder which may be loaded directly into dies or fed directly into pelleting machines without any preparation or mixing and which will produce in duplicate articles molded under the same conditions mottles which are duplicates in the sense that two pieces of veined marble cut from the same block are duplicates or that two pieces of grained wood cut from the same board are duplicates. The advantage of producing uniform articles in this respect will be obvious.

As many apparently widely different embodiments of this invention may be made without departing from the spirit and scope thereof, it is to be understood that the invention is not limited to the specific embodiments thereof except as defined in the appended claims.

I claim:

1. In the process of preparing plastic molding powders, and the like, wherein a plastic is kneaded to form a compacted, coherent mass, the steps comprising adding coloring matter to said plastic subsequent to the start of the kneading, continuing said kneading, and terminating said kneading before said coloring matter has been uniformly distributed throughout the compacted mass.

2. In the process of preparing plastic molding powders wherein a plastic is kneaded to form a compacted, coherent mass, the steps comprising adding coloring matter to said plastic subsequent to the start of the kneading, continuing said kneading, terminating said kneading before said coloring matter has been uniformly distributed throughout the compacted mass, and breaking said mass down into granular form.

3. In the process of preparing plastic molding powders wherein a plastic is kneaded in a masticator mixer to form a compacted, coherent mass, the steps comprising adding coloring matter to said plastic subsequent to the start of the kneading, continuing said kneading, terminating said kneading before said coloring matter has been uniformly distributed throughout the compacted mass, and breaking said mass down into granular form.

4. In the process of preparing cellulose acetate molding powders wherein a mixture comprising cellulose acetate and a plasticizer therefor are kneaded in a masticator mixer to form a compacted, coherent mass, the steps comprising adding coloring matter to said mixture subsequent to the start of the kneading, continuing said kneading, terminating said kneading before said coloring matter has been uniformly distributed throughout the compacted mass, and breaking said mass down into granular form.

5. In the process of preparing plastic molding powders, and the like, wherein a plastic is kneaded to form a compacted, coherent mass, the steps comprising adding to said plastic subsequent to the start of the kneading an additional quantity of a plastic compatible therewith, containing coloring matter dispersed therein, continuing said kneading, and terminating said kneading before said additional quantity of plastic has been uniformly mixed with the initial plastic.

6. In the process of preparing plastic molding powders wherein a plastic is kneaded in a masticator mixer to form a compacted, coherent mass, the steps comprising stopping said kneading prior to the end of the kneading cycle, replacing a portion of said plastic with approximately an equal amount of a plastic compatible therewith, having a different color, resuming said kneading, and terminating said kneading before said additional quantity of plastic has been uniformly mixed with the initial plastic.

7. In the process of preparing cellulose acetate molding powders wherein a mixture comprising cellulose acetate and a plasticizer therefor are kneaded in a masticator mixer to form a compacted, coherent mass, the steps comprising stopping said kneading prior to the end of the kneading cycle, replacing a portion of said mixture with appoximately an equal amount of a plastic mixture compatible therewith, having a different color, resuming said kneading, and terminating said kneading before said additional mixture has been uniformly mixed with the initial mixture.

8. In the process of preparing cellulose derivative molding powders wherein a mixture comprising a cellulose derivative and a plasticizer therefor are kneaded in a masticator mixer to form a compacted, coherent mass, the steps comprising adding a pigment color prior to complete homogenization of said mixture, and at such a time that, upon continuing said kneading to complete homogenization of the ingredients other than the pigment, said pigment will be non-uniformly distributed, and continuing said kneading for a period of time only sufficient to complete the homogenization of the ingredients other than the pigments.

ALAN F. RANDOLPH.

DISCLAIMER 2,059,394.—*Alan F. Randolph*, Montclair, N. J. PLASTIC COMPOSITION. Patent dated November 3, 1936. Disclaimer filed February 10, 1938, by the assignee, *E. I. du Pont de Nemours and Company*.

Hereby enters this disclaimer to claims 1, 2, and 5 in said specification.

[*Official Gazette March 8, 1938.*]

containing coloring matter dispersed therein, continuing said kneading, and terminating said kneading before said additional quantity of plastic has been uniformly mixed with the initial plastic.

6. In the process of preparing plastic molding powders wherein a plastic is kneaded in a masticator mixer to form a compacted, coherent mass, the steps comprising stopping said kneading prior to the end of the kneading cycle, replacing a portion of said plastic with approximately an equal amount of a plastic compatible therewith, having a different color, resuming said kneading, and terminating said kneading before said additional quantity of plastic has been uniformly mixed with the initial plastic.

7. In the process of preparing cellulose acetate molding powders wherein a mixture comprising cellulose acetate and a plasticizer therefor are kneaded in a masticator mixer to form a compacted, coherent mass, the steps comprising stopping said kneading prior to the end of the kneading cycle, replacing a portion of said mixture with appoximately an equal amount of a plastic mixture compatible therewith, having a different color, resuming said kneading, and terminating said kneading before said additional mixture has been uniformly mixed with the initial mixture.

8. In the process of preparing cellulose derivative molding powders wherein a mixture comprising a cellulose derivative and a plasticizer therefor are kneaded in a masticator mixer to form a compacted, coherent mass, the steps comprising adding a pigment color prior to complete homogenization of said mixture, and at such a time that, upon continuing said kneading to complete homogenization of the ingredients other than the pigment, said pigment will be non-uniformly distributed, and continuing said kneading for a period of time only sufficient to complete the homogenization of the ingredients other than the pigments.

ALAN F. RANDOLPH.

DISCLAIMER 2,059,394.—*Alan F. Randolph*, Montclair, N. J. PLASTIC COMPOSITION. Patent dated November 3, 1936. Disclaimer filed February 10, 1938, by the assignee, *E. I. du Pont de Nemours and Company*.

Hereby enters this disclaimer to claims 1, 2, and 5 in said specification.

[*Official Gazette March 8, 1938.*]

DISCLAIMER 2,059,394.—*Alan F. Randolph*, Montclair, N. J. PLASTIC COMPOSITION. Patent dated November 3, 1936. Disclaimer filed February 10, 1938, by the assignee, *E. I. du Pont de Nemours and Company*.

Hereby enters this disclaimer to claims 1, 2, and 5 in said specification.
[*Official Gazette March 8, 1938.*]